(12) United States Patent
Fischer

(10) Patent No.: US 8,632,093 B2
(45) Date of Patent: Jan. 21, 2014

(54) AIRBAG PROTECTION DEVICE FOR A VEHICLE OCCUPANT RESTRAINT SYSTEM AND METHOD OF MANUFACTURING AN AIRBAG PROTECTION DEVICE

(75) Inventor: Anton Fischer, Schechingen (DE)

(73) Assignee: TRW Automotive GmbH, Alfdorf (DE)

( * ) Notice: Subject to any disclaimer, the term of this patent is extended or adjusted under 35 U.S.C. 154(b) by 65 days.

(21) Appl. No.: 13/208,438

(22) Filed: Aug. 12, 2011

(65) Prior Publication Data

US 2012/0205897 A1    Aug. 16, 2012

(30) Foreign Application Priority Data

Sep. 22, 2010  (DE) .......................... 10 2010 046 293

(51) Int. Cl.
*B60R 21/213* (2011.01)
(52) U.S. Cl.
USPC ...................................... 280/728.2; 280/730.2
(58) Field of Classification Search
USPC ................................ 29/505; 280/728.2, 730.2
IPC ...................................................... B60R 21/213
See application file for complete search history.

(56) References Cited

U.S. PATENT DOCUMENTS

| | | | | |
|---|---|---|---|---|
| 5,516,145 A * | 5/1996 | Williams et al. | ............... | 280/732 |
| 5,752,713 A * | 5/1998 | Matsuura et al. | .......... | 280/730.2 |
| 5,816,610 A * | 10/1998 | Higashiura et al. | ......... | 280/728.3 |
| 5,988,674 A * | 11/1999 | Kimura et al. | ............. | 280/730.2 |
| 6,224,089 B1 * | 5/2001 | Uchiyama et al. | .......... | 280/728.2 |
| 6,254,123 B1 * | 7/2001 | Urushi et al. | ............... | 280/730.2 |
| 6,305,707 B1 * | 10/2001 | Ishiyama et al. | ........... | 280/728.2 |
| 6,439,597 B1 * | 8/2002 | Harada et al. | ............... | 280/728.2 |
| 7,040,647 B2 * | 5/2006 | Deligny et al. | ............. | 280/728.2 |
| 7,125,038 B2 * | 10/2006 | Gammill | ..................... | 280/728.2 |
| 7,159,894 B2 * | 1/2007 | Ronne et al. | ............... | 280/728.2 |
| 7,175,196 B2 * | 2/2007 | Boxey | ......................... | 280/730.2 |
| 7,219,921 B2 * | 5/2007 | Noguchi | .................... | 280/730.2 |
| 7,273,228 B2 * | 9/2007 | Noguchi et al. | ........... | 280/730.2 |
| 7,309,078 B2 * | 12/2007 | Nagata | ........................ | 280/728.2 |
| 7,328,911 B2 * | 2/2008 | Chapman | ................... | 280/728.2 |
| 7,331,598 B2 * | 2/2008 | Inazu et al. | ................ | 280/728.2 |
| 7,338,071 B2 * | 3/2008 | Noguchi et al. | ........... | 280/730.2 |
| 7,347,447 B2 * | 3/2008 | Nakanishi | .................. | 280/730.2 |
| 7,404,597 B2 * | 7/2008 | Romig | ......................... | 296/213 |
| 7,607,685 B2 * | 10/2009 | Jang et al. | .................. | 280/730.2 |
| 7,625,005 B2 * | 12/2009 | Saberan et al. | ............. | 280/730.2 |
| 7,677,595 B2 * | 3/2010 | Dominissini et al. | ...... | 280/728.2 |
| 7,735,857 B2 * | 6/2010 | Hidaka et al. | ............... | 280/730.2 |
| 7,748,734 B2 * | 7/2010 | Wilmot | ....................... | 280/730.2 |
| 7,976,055 B2 * | 7/2011 | Son | .............................. | 280/728.2 |
| 2005/0206135 A1 * | 9/2005 | Nelson et al. | ............... | 280/728.2 |
| 2006/0267315 A1 * | 11/2006 | White, Jr. | .................... | 280/730.2 |

(Continued)

FOREIGN PATENT DOCUMENTS

JP        2009067151 A  *  4/2009

*Primary Examiner* — Paul N Dickson
*Assistant Examiner* — Laura Freedman
(74) *Attorney, Agent, or Firm* — Tarolli, Sundheim, Covell & Tummino LLP

(57) ABSTRACT

The invention relates to an airbag protection device (10) for a vehicle occupant restraint system that includes an airbag mounting device (12). The airbag mounting device (12) includes first and second mounting members (14) which are mounted to the vehicle (100) spaced apart from each other and a cross-member (16) made of bent wire. An airbag (22) is mounted to the cross-member (16) in the folded state.

13 Claims, 3 Drawing Sheets

(56) References Cited

U.S. PATENT DOCUMENTS

| | | | |
|---|---|---|---|
| 2007/0090630 A1* | 4/2007 | Wilmot | 280/728.2 |
| 2008/0073883 A1* | 3/2008 | Fischer et al. | 280/728.2 |
| 2008/0122203 A1* | 5/2008 | Steinbach et al. | 280/728.2 |
| 2011/0140396 A1* | 6/2011 | Urabe et al. | 280/728.2 |

* cited by examiner

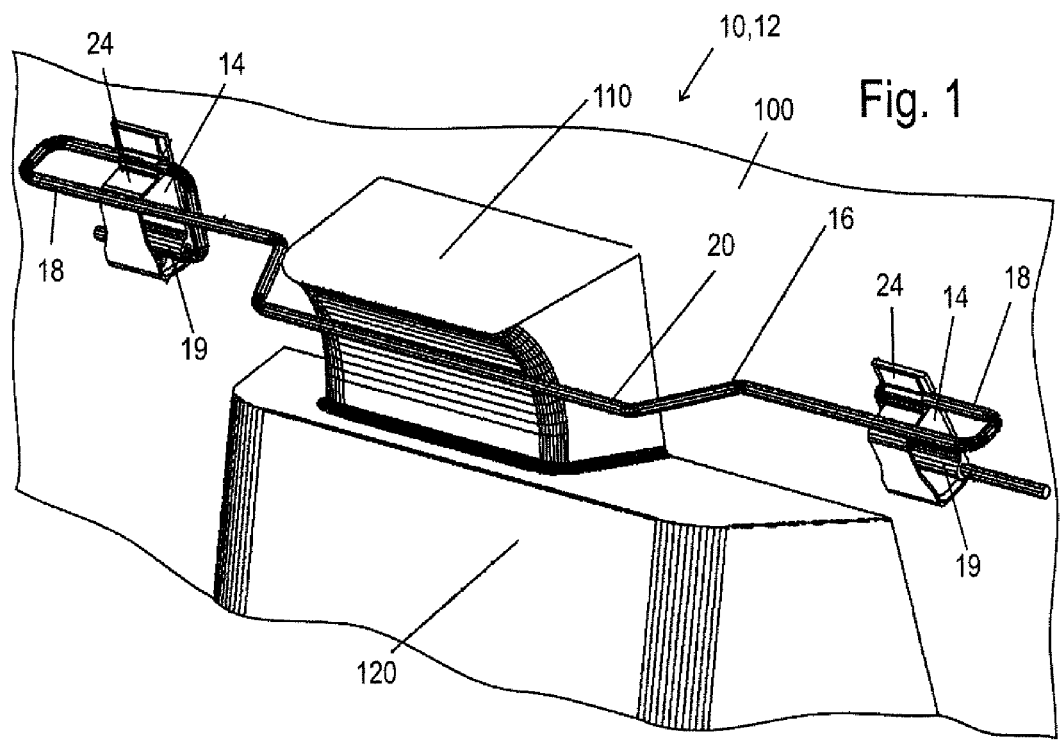
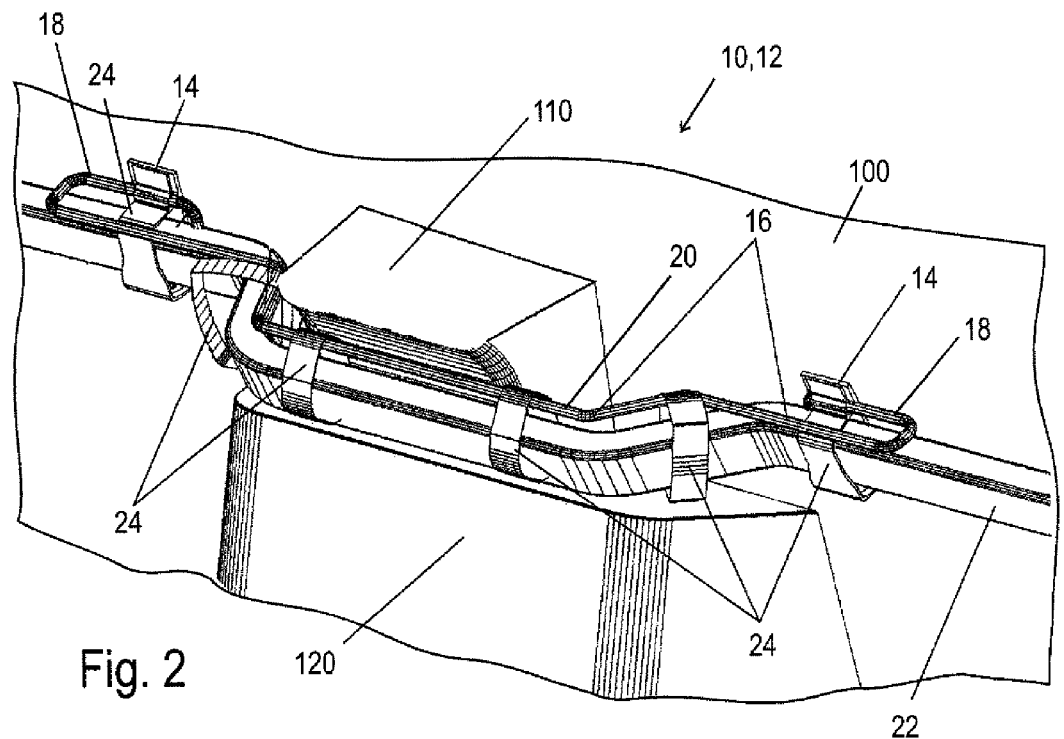

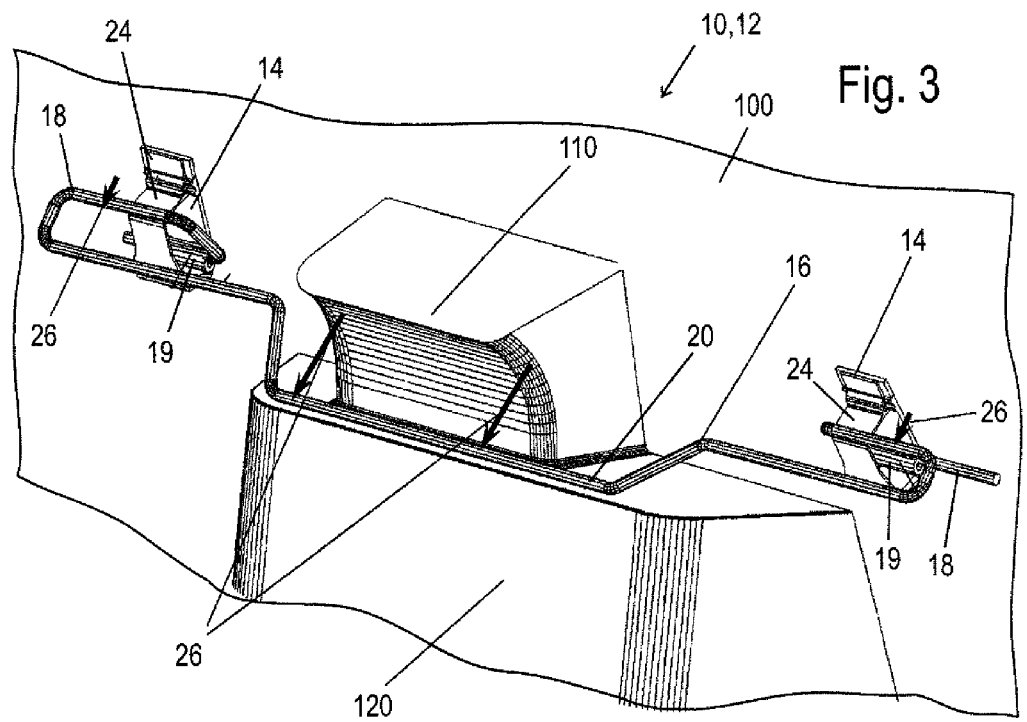
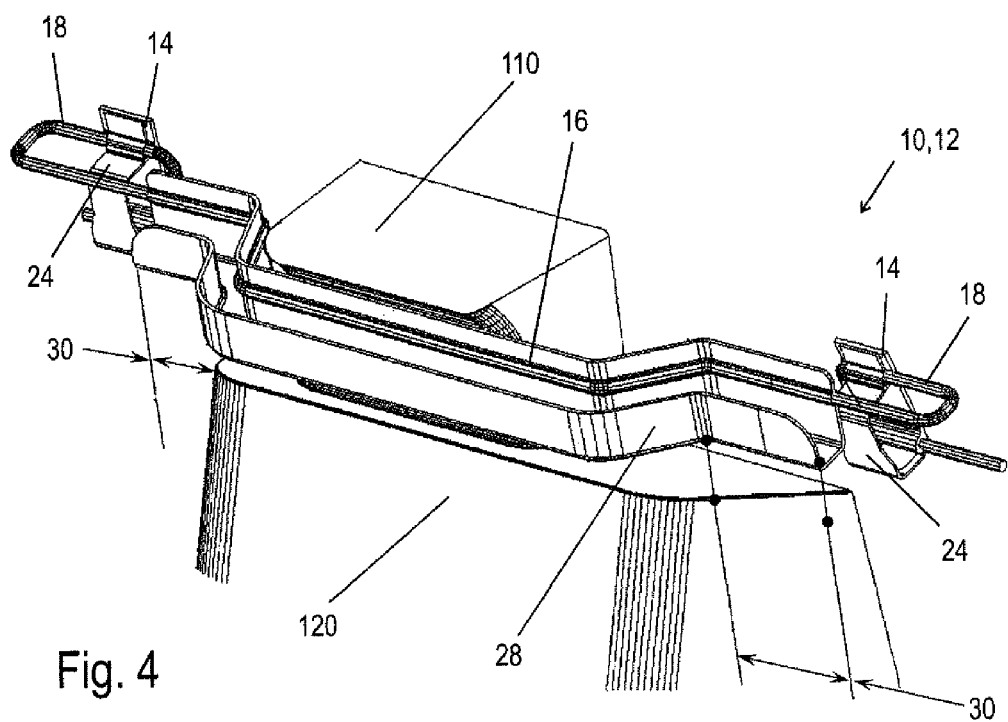

AIRBAG PROTECTION DEVICE FOR A VEHICLE OCCUPANT RESTRAINT SYSTEM AND METHOD OF MANUFACTURING AN AIRBAG PROTECTION DEVICE

FIELD OF THE INVENTION

The invention relates to an airbag protection device for a vehicle occupant restraint system comprising an airbag mounting device and an airbag as well as to a method of manufacturing an airbag protection device.

BACKGROUND OF THE INVENTION

Airbag protection devices serve for mounting and for protecting an airbag of a vehicle occupant restraint system in a vehicle. As the designs of various types of vehicles differ from one another, the design of the airbag protection device has to be adapted to the respective type of vehicle.

It is the object of the invention to provide an airbag protection device capable of being manufactured in an inexpensive manner and of being adapted to different types of vehicles in a simple fashion as well as an inexpensive manufacturing method of an airbag protection device for a plurality of various vehicle types.

SUMMARY OF THE INVENTION

The object of the invention is achieved by an airbag protection device for a vehicle occupant restraint system according to claim 1. The airbag protection device according to the invention comprises an airbag mounting device having first and second mounting members which are mounted to the vehicle spaced apart from each other, a cross-member made of bent wire and an airbag which in the folded state is mounted to the cross-member. The modular structure of the airbag mounting device enables the individual component parts to be manufactured in a simple and inexpensive manner and to be easily adapted to various vehicle types independently of each other. For instance, the mounting members can be designed as standard components irrespective of the vehicle type and differently bent cross-members can be provided for various types of vehicles.

In order to permit, on the one hand, tight mounting of the airbag to the airbag mounting device and, on the other hand, perfect deployment of the airbag, the airbag can be mounted to the cross-member by means of holding elements which can be destroyed upon activation of the vehicle occupant restraint system so that the airbag can deploy.

The airbag is preferably mounted directly to the cross-member, preferably by airbag ears through which the bent wire of the cross-member is run. In this way simple fastening of the airbag to the cross-member is permitted.

In order to permit movement of the airbag protection device upon activation of the vehicle occupant restraint system the cross-member can be movably supported, especially in a pivoting fashion, to the mounting members.

In order to move the airbag upon deployment to an advantageous position relative to the vehicle, the cross-member can be provided in a home position in the non-activated state and can be moved to an end position, especially by pivoting, upon deployment of the airbag.

In order to protect the folded airbag in a better way a flexible protective element can be provided for at least partly surrounding the folded airbag.

Preferably a flexible protective element is provided which is designed to cover an area of the vehicle adjacent to the airbag upon deployment of the airbag. In this manner, edges or surfaces of other components in the vehicle can be covered so as to protect the airbag during deployment and/or to permit more rapid deployment.

For instance, the protective element has a low friction coefficient, which facilitates sliding of the unfolding airbag on the protective element.

The cross-member is advantageously bent in the area between the mounting members spaced apart from each other so as to surround a component part of the vehicle disposed between the two mounting members. Thus especially component parts of the vehicle at which no direct mounting of the mounting members is possible can be surrounded by the cross-member.

The cross-member is bent in U-shape, for example, in the area of the mounting members, wherein the mounting member is preferably connected to both legs of the U-bent cross-member. In this way, the mounting of the cross-member to the mounting members is improved.

The object of the invention is moreover achieved by a method of manufacturing an airbag protection device for a plurality of vehicle types, the method comprising the following steps. First and second mounting members are provided, the mounting members being designed independently of the type of vehicle. A wire is bent to form a cross-member dependent on the respective type of vehicle. The cross-member is fastened to the mounting members and an airbag is fastened to the cross-member. Since the mounting members are standard components and only the cross-member formed of the bent wire has to be designed in response to the respective type of vehicle, it is possible in a simple and inexpensive manner to adapt the airbag protection device to different vehicle types. Since no particular tools are required to bend the wire for forming the cross-member for different configurations for different vehicle types, the manufacture of various embodiments of the cross-member is especially inexpensive. In particular compared to cross-members which are made as blanked or blanked and bent part, the wire configuration has considerable advantages in terms of costs. The costs of tools in the case of blanked and blanked and bent parts are definitely higher than the costs of tools for manufacturing a cross-member in the form of a bent wire.

The wire is preferably bent by a programmable bending machine which is differently programmed for different types of vehicles. This permits inexpensive manufacture, especially in series production, of differently shaped cross-members for various vehicle types by one machine only without any tools having to be exchanged.

BRIEF DESCRIPTION OF THE DRAWINGS

FIG. 1 shows an airbag protection device according to the invention prior to mounting an airbag;

FIG. 2 shows the airbag protection device according to FIG. 1 including the airbag mounted thereto;

FIG. 3 shows the airbag protection device according to FIG. 1 including the pivoted cross-member;

FIG. 4 is a second embodiment of an airbag protection device according to the invention.

DESCRIPTION OF THE EXAMPLE EMBODIMENTS

Figure 5:
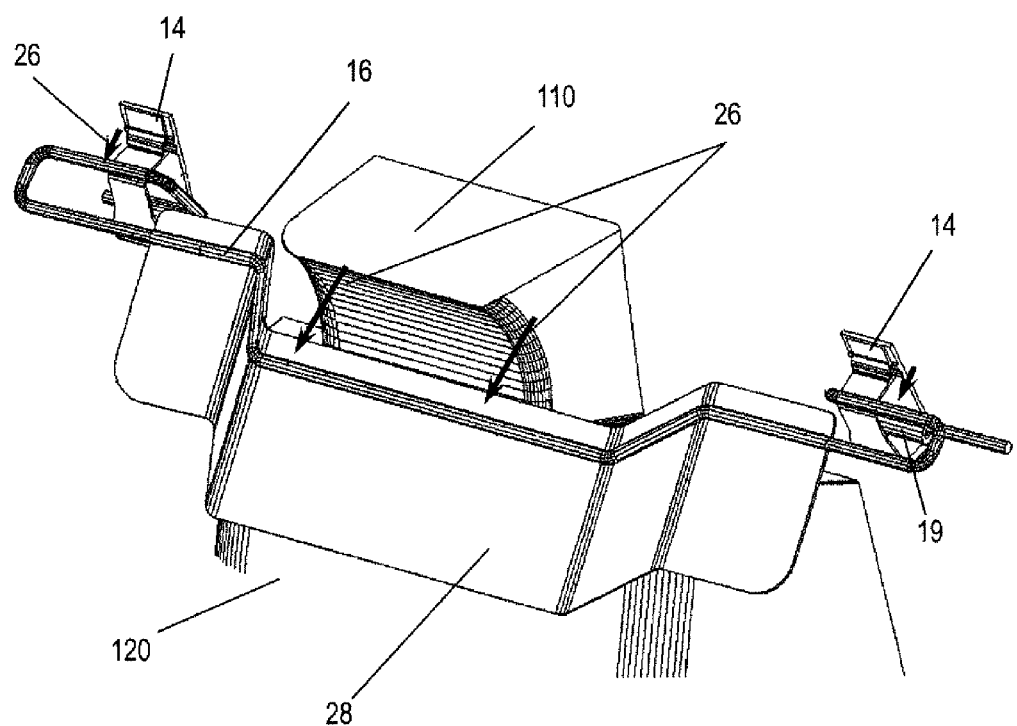
FIG. 5 shows the airbag protection device according to FIG. 4 including the pivoted cross-member.

By way of FIGS. 1, 2 and 3 a first embodiment of an airbag protection device 10 of a vehicle occupant restraint system is illustrated. In the shown embodiment the vehicle occupant restraint system is a head airbag, but the airbag protection device can also be provided for other vehicle occupant restraint systems including an airbag.

FIG. 1 shows an airbag mounting device 12 of the airbag protection device 10 including first and second mounting members 14 which are mounted to a vehicle 100 spaced apart from each other. A cross-member 16 made of bent wire is fastened to the respective first and second mounting members 14.

The cross-member 16 has two end portions 18 in which the cross-member 16 has several U-shaped bends, the cross-member 16 being connected to the mounting members 14 at said end portions 18. It is also possible, as a matter of course, that the cross-member 16 is connected to at least one mounting member 14 in a central portion of the cross-member 16.

The vehicle 100 includes a component part 110 in the area between the first and second mounting members 14. In the illustrated embodiment, the component part 110 is a passage of a venting system of the vehicle 100 at which no direct mounting of the airbag protection device 10 is possible. The component part 110 is surrounded by a lining 120 in the area below the airbag protection device 10.

The cross-member 16 is furthermore bent in a central portion 20 between the mounting members 14 spaced apart from each other so as to surround the component part 110 of the vehicle 100.

In the shown embodiment the wire of the cross-member 16 has a circular cross-section. However, also different cross-sections could be provided.

FIG. 2 shows the airbag protection device 10 including an airbag 22. The airbag 22 has plural ears by which the airbag 22 is fastened directly to the cross-member 16. The bent wire of the cross-member 16 is run through the ears at the airbag 22. The ears of the airbag 22 for fastening to the cross-member 16 are not visible in FIG. 2.

In the folded state the airbag 22 is moreover fastened to the cross-member 16 by holding elements 24. The holding elements 24 are destroyed upon activation of the vehicle occupant restraint system so that the airbag 22 can be deployed. In the shown embodiment the holding elements 24 are adhesive tapes that break upon activation of the vehicle occupant restraint system.

It is also possible that the airbag 22 is fastened to the cross-member 16 exclusively by means of the destroyable holding elements 24 prior to activation of the vehicle occupant restraint system.

As it is clearly visible from FIG. 1, the cross-member 16 is connected to the mounting member 14 by a U-bent section of the end portion 18 of the wire. The lower leg of the U-shaped wire is rotatably supported in a bearing 19 in the mounting member 14, whereby the cross-member 16 is allowed to pivot about the axis of rotation of the lower leg of the U-shaped section. The upper leg of the U-shaped section is connected to the mounting member 14 by a holding element 24 in the form of an adhesive tape and fixes the cross-member 16 in a home state of the airbag protection device 10.

Upon activation of the vehicle occupant restraint system the holding element 24 is destroyed and the cross-member 16 carries out a swivel movement from its home position shown in FIGS. 1 and 2 to an end position shown in FIG. 3 upon deployment of the airbag. The swivel movement is marked by the arrows 26 in FIG. 3. The airbag protection device 10 is arranged at the vehicle such that the central portion 20 of the cross-member 16 is provided at the end position of the cross-member in the area of the edge of the lining 120 of the component part 110 of the vehicle 100.

The swivel movement of the cross-member 16 enables the airbag protection device 10 to require, with the cross-member in its home position, as little construction space as possible in the vehicle when the airbag 22 is folded, whereas upon activation of the vehicle occupant restraint system and deployment of the airbag 22 the cross-member 16 is disposed at an end position advantageous to the deployment of the airbag 22.

The FIGS. 4 and 5 illustrate a second embodiment of an airbag protection device 10. For the sake of clarity, in each case the airbag protection device 10 is shown without an airbag 22. Compared to the first embodiment, the second embodiment additionally includes a flexible protective element 28 which is a sliding fabric in the shown embodiment. The protective element 28 is made of a material having a low friction coefficient or is provided with a coating having a low friction coefficient.

As is evident in FIG. 4, the flexible protective element 28 surrounds the airbag 22. The protective element 28 is chosen in the shown embodiment so that the width of the protective element 28 corresponds to the width of the lining 120 of the component part 110 of the vehicle having a projection 30 on both sides of the lining 120.

FIG. 5 illustrates the airbag protection device 10 of FIG. 4, the cross-member 16 being pivoted into its end position according to the arrows 26. The flexible protective element 28 is unrolled by the deploying airbag 22 and covers the edge as well as parts of the surface of the lining 120 of the component part 110 of the vehicle 100. This is to prevent the airbag 22, upon deployment, from being caught at the edge of the lining 120, and the airbag 22 can slide more easily and rapidly over the lining 120 projecting into the interior of the vehicle.

Hereinafter a manufacturing method of the airbag protection device 10 shall be illustrated. The manufacturing method permits the manufacture of an airbag protection device 10 for a plurality of different types of vehicles in a simple manner.

In a first method step the mounting members 14 are provided. The mounting members 14 are designed independently of the vehicle type and can be mounted at appropriate positions of the different vehicle types.

In a second method step a wire is shaped by bending to form the cross-member 16. The cross-member 16 is designed differently depending on the vehicle type, for instance in response to the fastening positions of the mounting members 14 or the specific design of the component part 110 and the lining 120 thereof.

Since only one tool is required to bend a wire independently of the respective final shape, inexpensive manufacture of the airbag protection device 10 is possible. The mounting members 14 can be used as standard parts for different types of vehicles.

In the preferred method variant the wire is bent by a programmable bending machine which is differently programmed for different types of vehicles. One single CNC bending machine of this type thus permits the series production of airbag protection devices 10 having differently shaped cross-members 16 for a plurality of different types of vehicles.

In further method steps the cross-member 16 is fastened to the mounting members 14 and the airbag 22 is fastened to the cross-member 16. To this end, the lower legs of the U-shaped sections of the end portions 18 of the cross-member 16 are rotatably supported in a bearing 19 of the mounting members 14 and the upper legs of the U-shaped sections are fixed to the mounting members 14 by the holding elements 24.

The invention claimed is:
1. An airbag protection device (10) for a vehicle occupant restraint system comprising an airbag mounting device (12)

including first and second mounting members (14) which are fastened to a vehicle (100) spaced apart from each other, comprising a cross-member (16) made of bent wire and comprising an airbag (22) which in a folded state is mounted to the cross-member (16), the cross-member (16) including opposing bent end portions (18) directly connected to the first and second mounting members (14), wherein the airbag (22) is fastened to the cross-member (16) by means of holding elements (24) which can be destroyed upon activation of the vehicle occupant restraint system so as to deploy the airbag (22).

2. The airbag protection device according claim 1, wherein the cross-member (16) is supported at the mounting members (14) in a movable fashion.

3. The airbag protection device according to claim 2, wherein in a non-activated state the cross-member (16) is provided in a home position and upon deployment of the airbag (22) is moved to an end position by pivoting.

4. The airbag protection device according to claim 3, wherein each end portion (18) of the wire is rotatably supported in a bearing (19) such that the wire has a first condition when the airbag (22) is in the folded state, the wire rotating about the bearings to a second condition when the airbag (22) deploys.

5. The airbag protection device according to claim 2, wherein the cross-member (16) is supported at the mounting members (14) in a pivoting fashion to permit pivotal movement of the cross-member (16) and the airbag (22) relative to the mounting members (14).

6. The airbag protection device according claim 1, wherein a flexible protective element (28) is provided for at least partly surrounding the folded airbag (22).

7. The airbag protection device according to claim 1, wherein a flexible protective element (28) is provided which is configured to cover an area of the vehicle (100) adjacent to the airbag (22) upon deployment of the airbag (22).

8. The airbag protection device according to claim 1, wherein the cross-member (16) is bent in an area between the mounting members (14) spaced apart from each other so as to surround a component part (110) of the vehicle (100) arranged between the two mounting members (14).

9. An airbag protection device (10) for a vehicle occupant restraint system comprising an airbag mounting device (12) including first and second mounting members (14) which are fastened to a vehicle (100) spaced apart from each other, comprising a cross-member (16) made of bent wire and comprising an airbag (22) which in a folded state is mounted to the cross-member (16), the cross-member (16) including opposing bent end portions (18) bent in a U-shape and directly connected to the first and second mounting members (14).

10. The airbag protection device according to claim 9, wherein each U-shaped bend is pivotably connected to one of the mounting members (14).

11. A method of manufacturing an airbag protection device (10) for a plurality of different vehicle types comprising the method steps of:
   a) providing an airbag module device (12) having first and second mounting members (14), the mounting members (14) being configured independently of the type of vehicle;
   b) fastening the mounting members (14) to the vehicle;
   c) bending a wire to form a cross-member (16) in response to the respective type of vehicle;
   d) fastening the cross-member (16) to the mounting members (14);
   e) mounting an airbag (22) to the cross-member (16) in a folded state.

12. The method according to claim 11, wherein the wire is bent by a programmable bending machine which is differently programmed for various types of vehicles.

13. An airbag protection device (10) for a vehicle occupant restraint system comprising:
   an airbag mounting device (12) including first and second mounting members (14) spaced apart from each other and fastened to a vehicle (100);
   a cross-member (16) having end portions (18) pivotably connected to the first and second mounting members (14); and
   an airbag (22) mounted in a folded state to the cross-member (16) such that the cross-member (16) permits pivotal movement of the airbag (22) and the cross-member (16) relative to the mounting members (14), wherein each end portion (18) includes a U-shaped bend connected to one of the mounting members (14).

* * * * *